Feb. 13, 1934.  E. A. BRINER  1,946,571
PROPELLER WITH AUXILIARY BLADES APPLICABLE TO DRIVING AIRCRAFT
Filed Aug. 29, 1932  2 Sheets-Sheet 1
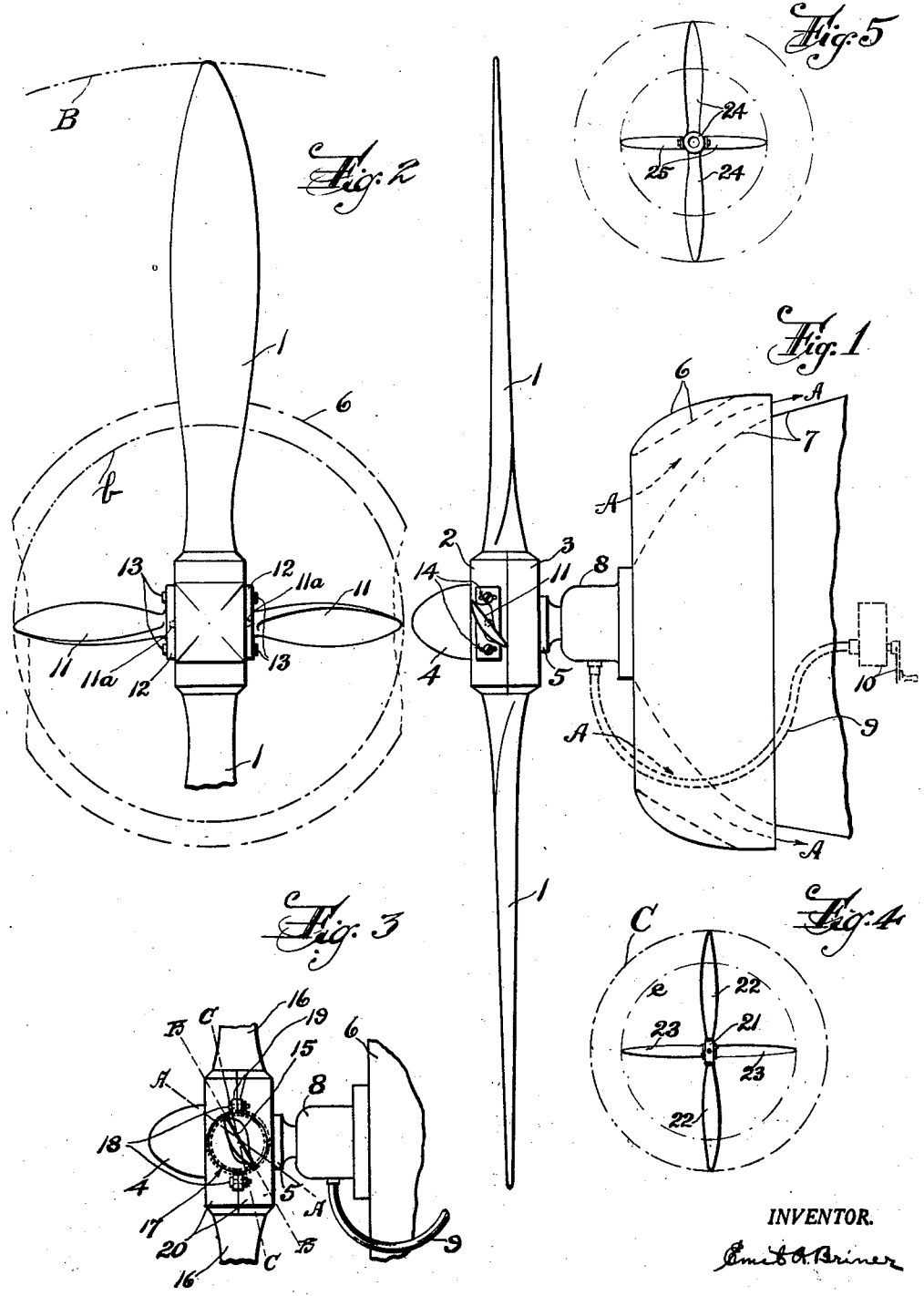
INVENTOR.
Emil A. Briner

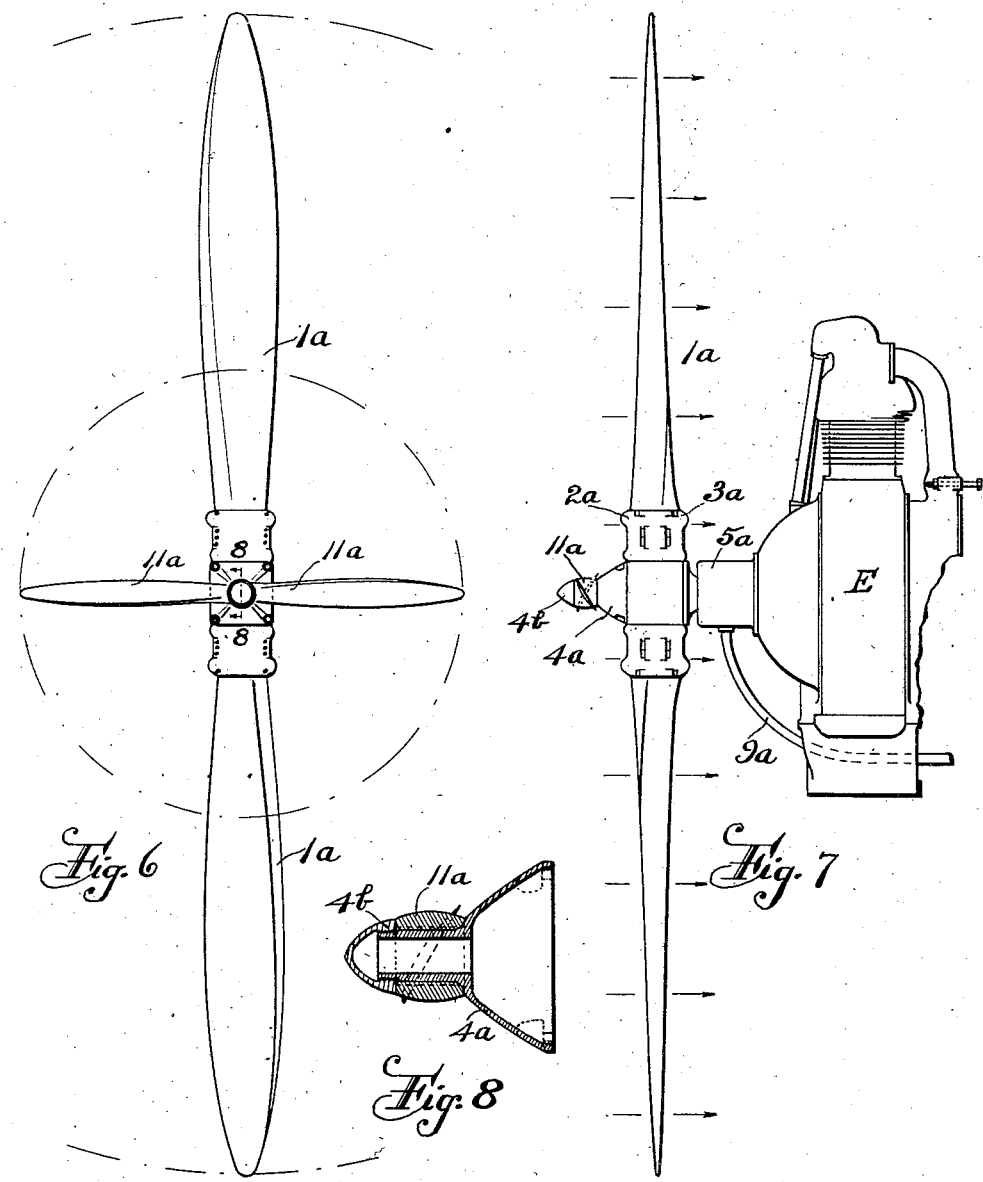

Patented Feb. 13, 1934

1,946,571

UNITED STATES PATENT OFFICE 1,946,571

PROPELLER WITH AUXILIARY BLADES APPLICABLE TO DRIVING AIRCRAFT

Emil A. Briner, East Orange, N. J.

Application August 29, 1932. Serial No. 630,778

6 Claims. (Cl. 170—165)

This invention relates to improvements in propellers by means of short auxiliary blades for driving aircraft. It more particularly relates to aircraft propellers wherein the strength requirements of the hub result in coarse blade roots. The latter are not conducive to propeller efficiency. I use the word efficiency throughout in its technical sense of ratio of useful power to power input. In the coarse blade root class belong propellers of the controllable and adjustable pitch type, in which large round blade roots are socketed in a large hub.

The invention has for its object to obtain a small increase in the overall efficiency of such propellers by improving their effectiveness at the core of the air stream. Short auxiliary blades are introduced having relatively thin airfoil sections, adding propulsive elements where rotational movement is weak. Such blades are not subject to the severer structural requirements of main blades with their greater weight, thrust, and tip speed. Main and auxiliary blades are made to combine in single stage operation.

Tests have shown that if an ordinary two bladed propeller of standard form, ten feet in diameter, is cut down to eight feet in diameter and the "tips" neatly rounded off; there will be a drop in maximum efficiency from 83% for the 10 ft. propeller to 78% for the 8 ft. propeller approximately. This serves as a hint that the coarse inner part of a standard propeller is not as efficient as the much thinner tips. Such tests would be still more convincing if carried further in the same direction.

Again, tests of propellers have indicated that where the pitch of propeller blades has been relatively increased toward the hub, there is a gain in the quantity of air going through the core of the propeller air stream, but a loss in overall propeller efficiency. This gives an indication that such a method is not the correct one for improving propeller efficiency. However, such arrangements may be made efficient if supplemented by auxiliary blades taking the major part of the core load.

In testing standard propellers, there is found a rather useless area at the heart of the propeller disc amounting to approximately 22% of the diameter, or about 5% of the disc area. Such area is usually ignored in disc area calculations. The writer has observed that the flow of air is sometimes decidedly negative in such area, and immediately beyond it. It is this ignored area, and beyond, that is utilized in promoting propeller efficiency. An increase of even five percent in improving propeller efficiency would be a great achievement.

Actual tests have shown that it is necessary to go half way out from the hub to the tips before one strikes a strong thrust current. Even then such current in the slip stream core is a rather weak affair. It lacks power. It is strong on its outer edge, tapering rapidly to negative values at the hub. This phenomena invites the thought that this air core is not strictly produced by the core structure of the propeller, but is largely an induced velocity produced by impulse received from effective portions of the blade further out toward the tip.

If a standard propeller were reduced by cutting the tips down to one half its original diameter, maintaining its original coarse structure, it would be an inefficient propulsive instrument in comparison with a standard propeller built to the smaller diameter with normal proportions.

Recorded measurements of the air velocity going through the core of the slip stream have been deceptive, because the observations were taken in the wake of the propeller. The outflow velocity is always relatively strong even at a distance of five to ten diameters behind a propeller. To obtain higher efficiency the core of air at the center must be impelled at the same rate of speed as the enveloping portions having, for example, three times the volume.

The intake airstream into which I extend the auxiliary blades, always has relatively low velocity, which in still air is zero at a distance of one diameter ahead of the propeller.

It is necessary to give air a backward motion in order to develop thrust. An object is to increase the thrust and the propeller efficiency in the core of the propeller air stream, by the use of short intermediate auxiliary blades approximately in the orbit of operation of the main blades, or overlapping the forward portions of said orbit.

The idea involves single stage operation of combined main and auxiliary blades. Two stage operation of auxiliary and main blades is rejected as impractical,—not coming within the purview of the invention except for engine cooling purposes.

Another object is to insure better and more positive engine cooling, especially for different kinds of air cooled engines installed under varying conditions, where adjustment of the auxiliary blades may be made to increase or decrease engine cooling with economy of power. Another object is the practical utility of being able to adjust the pitch of the auxiliary blades relative to the main blades to suit any special requirements of service, efficiency, engine cooling, etc.

Other objects of the invention, not at this time more particularly enumerated, will become apparent in the following detailed description of the same.

Illustrative examples are shown in the accompanying drawings.

Wherever "adjustable pitch" or "adjustable blades" appear in the document, it implies "setting while stationary on the ground"; whereas "variable pitch" and more properly "controllable pitch" means that the blades are capable of setting to any desired pitch, while the propeller is in rotation in the air.

Fig. 1 represents an outside view of a controllable pitch propeller having main and auxiliary blades.

Fig. 2 is a partial view of the same propeller taken from the left of Fig. 1.

Fig. 3 is a partial view of a controllable pitch propeller having two main blades broken away, and auxiliary blades having a modified form of flange adjustment.

Fig. 4 is an end view of a standard two bladed propeller of a type known as adjustable pitch, with auxiliary blades in larger relative proportion than in Fig. 2.

Fig. 5 is the same as Fig. 4, except that the hub and main blades are integral, while the auxiliary blades are adjustable.

Figs. 6 and 7 are correlated, and show an exception to the idea, in the form of a separate pilot propeller, operating in a small orbit of its own, spaced apart and ahead of the main propeller, for engine cooling purposes only; and not necessarily promoting propeller efficiency.

Fig. 8 is an enlarged section of propeller nose cap at 8—8 in Fig. 6.

Similar characters of reference are employed in the above described views, to indicate corresponding parts.

In Fig. 1, controllable pitch blades 1, are swively mounted in a hub having broken halves 2 and 3, and a nose cap 4. The hub is rigidly connected with shaft sleeve 5, fastened to a radial aircooled engine assumed as cowled in sheet metal cowling 6, and having a correlative streamline cowling 7. Certain arrows A, indicate the path of a portion of the airstream between the inner and outer cowling for engine cooling. The cowling merely illustrates a form in current practice.

The main blades 1 and 1, are controlled through an intermediate gear in casing 8, while a flexible shaft 9, is shown connected with a hand control mechanism and crank 10. Details of the intermediate gear, and hand control mechanism as shown in dotted lines may be found in co-pending patent application, Serial No. 630,612, of Aug. 27th, 1932. My auxiliary blades may be used in connection with any controllable pitch or variable pitch propeller by proper mounting.

In Figs. 1 and 2, are shown a pair of auxiliary blades 11, with base pivots 11a, fastened to half 2, of the hub, by means of flanges 12, and bolts 13, in oval flange holes 14. The holes are made oval so that the auxiliary blades may be given an adjustment on the ground, independent of the controllable blades, either for improving the propeller efficiency at some particular setting of the main blades, or for improving, or lessening the engine cooling. The auxiliary blades also serve for engine cooling, and as a fixed air load on the engine, when the main blades are moved through the zero pitch position. Such zero pitch is that position in which the thrust would be zero in operation.

In Fig. 1, it is assumed that both the main and the auxiliary blades, illustrate right hand blades with air current passing from left to right, when the propeller operates. The propeller is therefore a tractor propeller (right hand). It should be specially noted in Fig. 1, that the auxiliary blades are attached to the hub casing slightly forward of the hub center line. This attachment is the preferred position. It insures single stage operation with the main blades. It is important to make the thin auxiliary blades create their own air flow in the central portion of the airstream, instead of operating in an induced airflow created by the main blades. This means single stage of operation for the combination.

In Fig. 2, an arc B, shows the sweep of the main blade tips and indicates its disc area, while the smaller circle b, shows the circle swept by the auxiliary blades. In Fig. 4, corresponding circles are designated C and c, respectively.

In aircraft propellers, the main blades are seldom of a true helical form. Their faces often have a screw form at some particular propeller pitch, for example, a geometric pitch of seven-tenths of the diameter. The average geometrical pitch setting is commonly assumed at a distance seventy-five percent of the radial distance, from the hub center. If a pitch of seven feet, requires a 15½ degree pitch angle at 75% radius, then it is evident that a pitch of seven feet for the auxiliary blades might be more than double such angle to attain the same average pitch of seven feet. This auxiliary blade setting is crudely indicated in Fig. 3, by the line BB.

In Fig. 3, is shown substantially the same outline as a fragment of Fig. 1, except that auxiliary blades 15, have their axis in the same plane as the main blades 16. The auxiliary blades are adjustable as to position by circular flange 17 and bolts 18, in flanges 19, of hub halves 20. The lines AA and CC indicate other average pitch angles into which the blade face may be adjusted.

In Fig. 4, looking in line with the shaft axis, a propeller is shown having a hub 21, with main adjustable blades 22, and adjustable auxiliary blades 23. In Fig. 4, the auxiliary blades are preferably attached, similar to Fig. 1, very slightly forward of the hub center line. These auxiliary blades have a large diameter approximating three-quarters of the diameter of the main blades, so that disc area c, is about 56% of disc area C. In Fig. 2, the auxiliary blades have one-third of the diameter of the main blades, so that disc area b, is only about 11% of the disc area B. Figs. 2 and 4, represent extremes in promoting propeller efficiency with auxiliary blades; the one being near the lower limit, and the other at the upper limit of relative diameter ratio.

To be more explicit, the claims are limited to auxiliary blades having an assembled diameter between one quarter and three quarters of the assembled diameter of the main blades. The main blades may be of any number and the auxiliary blades preferably of the same number.

The round radial blade holding portions of the hub, and the thick almost round blade roots form inefficient portions of variable and adjustable pitch propellers, which are subject to my improvement.

The exception shown in Figs. 6, 7 and 8, is a more convenient adaptation, but not preferred.

It need not be described in detail, as the same characters are used plus a modifying letter *a*, as in Figs. 1 and 2. A pilot propeller 11*a*, fitted on a splined propeller nosecap 4*a* and spaced apart from the main propeller, is secured with propeller nut 4*b*. In Fig. 7, the arrows indicate airstream, and E is an aircooled engine for driving the impeller, a combination main and pilot propeller, i. e., a two stage or compound propeller.

All kinds of blade contours, pitch distribution, airfoil sections, and materials, are available for use in the main and auxiliary blades. Various kinds of relative pitch settings may be made to suit wide ranges in conditions of operation.

It must be borne in mind that standard propellers of the type described are reported as capable of utilizing a maximum of 82% of the power input, when operating under the very best conditions without using any auxiliary blades. Also it is estimated from tests that ordinary propellers lose as much as 5 to 10% in meeting practical conditions of installation.

Meeting these practical conditions are more favorable to gain in overall operating efficiency, because interferences of engines, fuselages, nacelles, wings. struts, etc., can to some extent be compensated in the propeller unit. The drag in the core of a slip stream can at least be obviated by the auxiliary blades described herein.

In a case where a propeller with auxiliary blades operates as a pusher propeller behind an engine nacelle, the auxiliary blades could be set to take full advantage of the air wake affecting the core of the slip stream. A different auxiliary blade setting would be used to operate in the wake of a fuselage, than in an instance of a tractor propeller.

Under favorable engine revolutions, the main blades of a propeller may synchronize with torsional vibration of its power shaft. It is desirable to interfere with such torsional vibration. By adding auxiliary blades of a different vibratory period to the main blades, it is possible to dampen such torsional vibration and smooth out motor operation. In rare instances such torsional vibration assumes dangerous proportions accounting for shaft failures.

In theory and in practice, it has been found that similar blades have a natural vibratory frequency inversely proportional to their radii. This property becomes a valuable feature in the application of auxiliary blades to standard propeller practice in connection with aircraft.

While certain illustrative embodiments of the invention have been described, it is not my intention to limit the scope of the invention to those particular embodiments, or otherwise than by the terms of the appended claims.

I claim the following:

1. An aircraft propeller comprising, a hub member having radial blade holders, main controllable pitch blades swivelly mounted therein, and a like number of auxiliary blades of adjustable pitch attached to said hub; said auxiliary blades having an assembled diameter of not less than one quarter and not more than three quarters of the assembled diameter of the main blades, and operable with the main blades in a single stage orbit.

2. An aircraft propeller comprising, a hub member having radial blade holders, main controllable pitch blades swivelly mounted therein, and a like number of auxiliary blades rigidly attached to said hub; said auxiliary blades having an assembled diameter of not less than one quarter and not more than three quarters of the assembled diameter of the main blades, and operable with the main blades in a single stage orbit.

3. An aircraft propeller comprising, a hub member having radial blade holders, main adjustable pitch blades rigidly clamped therein, and a like number of auxiliary blades of adjustable pitch attached to said hub; said auxiliary blades having an assembled diameter of not less than one quarter and not more than three quarters of the assembled diameter of the main blades, and operable with the main blades in a single stage orbit.

4. An aircraft propeller comprising, a hub member having radial blade holders, main adjustable pitch blades clamped therein, and a like number of auxiliary blades rigidly attached to said hub; said auxiliary blades having an assembled diameter of not less than one quarter and not more than three quarters of the assembled diameter of the main blades, and operable with the main blades in a single stage orbit.

5. An aircraft propeller comprising, a hub member with integral main blades, and a like number of intermediate auxiliary blades capable of adjustable pitch attached to said hub; the auxiliary blades having an assembled diameter of not less than one quarter and not more than three quarters of the assembled diameter of the main blades, and operable with the main blades in a single stage orbit.

6. A compound aircraft impeller attached to an air cooled engine, comprising a main helical blade propeller supplemented with a leading spaced apart pilot leading propeller spaced from said main propeller by a nose cap, said pilot propeller having not less than one quarter and not more than two thirds of the diameter of the main propeller, and operable with the main propeller blades in compound staggered relation; whereby improved cooling is attained in said air-cooled engine.

EMIL A. BRINER.